United States Patent
Rostagni et al.

(10) Patent No.: US 10,452,502 B2
(45) Date of Patent: Oct. 22, 2019

(54) HANDLING NODE FAILURE IN MULTI-NODE DATA STORAGE SYSTEMS

(71) Applicant: INTERNATIONAL BUSINESS MACHINES CORPORATION, Armonk, NY (US)

(72) Inventors: Florent Rostagni, Southampton (GB); Andrea Sipka, Chandler's Ford (GB); John Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/877,405

(22) Filed: Jan. 23, 2018

(65) Prior Publication Data
US 2019/0227888 A1   Jul. 25, 2019

(51) Int. Cl.
*G06F 11/20* (2006.01)
*G06F 11/14* (2006.01)
*G06F 9/52* (2006.01)

(52) U.S. Cl.
CPC ............ *G06F 11/2064* (2013.01); *G06F 9/52* (2013.01); *G06F 11/1448* (2013.01); *G06F 11/1464* (2013.01); *G06F 11/2076* (2013.01)

(58) Field of Classification Search
CPC .... G06F 11/2064; G06F 9/52; G06F 11/1448; G06F 11/1464; G06F 11/2076
See application file for complete search history.

(56) References Cited

U.S. PATENT DOCUMENTS

| | | |
|---|---|---|
| 5,694,596 A | 12/1997 | Campbell |
| 5,835,911 A | 11/1998 | Nakagawa et al. |
| 5,937,405 A | 8/1999 | Campbell |
| 6,173,377 B1 * | 1/2001 | Yanai .................. G06F 3/0601 711/154 |
| 6,377,951 B1 | 4/2002 | Campbell |
| 6,678,809 B1 | 1/2004 | Delaney et al. |
| 7,103,586 B2 | 9/2006 | Holenstein et al. |

(Continued)

FOREIGN PATENT DOCUMENTS

WO   2015183301 A1   12/2015

OTHER PUBLICATIONS

IBM: List of IBM Patents or Patent Applications Treated as Related (Appendix P), Jan. 29, 2018, pp. 1-2.

(Continued)

*Primary Examiner* — Tasnima Matin
(74) *Attorney, Agent, or Firm* — Kristofer L. Haggerty

(57) ABSTRACT

A multi-node data storage system comprises a first data storage system having an owner node and a backup node in a first location coupled to a second data storage system having an owner node and a backup node in a second location. Each storage system includes a copy of the same data volume. A failure of a node of the multi-node storage system is detected. An outstanding write request to the first storage system is identified. If the owner node in the first storage system fails, it is determined whether the outstanding write corresponds to a host write to the backup node of the first storage system. If so, a retransmission message is sent to the second storage system. Otherwise, the data region associated with the outstanding write request is read from the first storage system, and a resynchronization message is sent to the second storage system.

17 Claims, 10 Drawing Sheets

(56) References Cited

U.S. PATENT DOCUMENTS

| | | | |
|---|---|---|---|
| 7,177,866 B2 | 2/2007 | Holenstein et al. | |
| 7,237,078 B2 | 6/2007 | Hiraiwa et al. | |
| 7,293,050 B2 | 11/2007 | Arakawa et al. | |
| 7,340,743 B1 | 3/2008 | Anural et al. | |
| 7,376,078 B1* | 5/2008 | Amiocangioli | H04L 45/00 370/217 |
| 8,346,719 B2 | 1/2013 | Sudhakar | |
| 8,868,857 B2 | 10/2014 | Wilkinson | |
| 8,868,874 B2 | 10/2014 | Wilkinson | |
| 8,874,680 B1 | 10/2014 | Das | |
| 9,032,160 B1 | 5/2015 | Natanzon et al. | |
| 9,229,827 B2 | 1/2016 | Burr et al. | |
| 9,244,997 B1 | 1/2016 | Natanzon et al. | |
| 9,459,804 B1 | 10/2016 | Natanzon et al. | |
| 9,575,857 B1 | 2/2017 | Natanzon | |
| 2004/0260726 A1 | 12/2004 | Hrle et al. | |
| 2005/0071708 A1* | 3/2005 | Bartfai | G06F 11/2064 714/6.3 |
| 2007/0050573 A1 | 3/2007 | Arakawa et al. | |
| 2007/0226277 A1 | 9/2007 | Holenstein et al. | |
| 2013/0198477 A1 | 8/2013 | Wilkinson | |
| 2013/0315258 A1 | 11/2013 | Narvaez et al. | |
| 2015/0067387 A1* | 3/2015 | Liao | G06F 11/2094 714/6.3 |
| 2015/0370700 A1 | 12/2015 | Sabol et al. | |
| 2016/0004616 A1* | 1/2016 | Narita | G06F 12/00 714/6.3 |
| 2016/0274796 A1 | 9/2016 | Braddy | |
| 2017/0039099 A1 | 2/2017 | Ottavio | |
| 2017/0091044 A1 | 3/2017 | Beeken et al. | |

OTHER PUBLICATIONS

Zaharia et al., "Discretized Streams: An Efficient and Fault-Tolerant Model for Stream Processing on Large Clusters," 4th USENIX Workshop on Hot Topics in Cloud Computing, HotCloud '12, Jun. 12-13, 2012, Boston, MA, pp. 1-6.

Parno et al., "Distributed Detection of Node Replication Attacks in Sensor Networks," Proceedings of the 2005 IEEE Symposium on Security and Privacy (S&P'05), May 8-11, 2005, Oakland, CA, USA, Date Added to IEEE Xplore: May 23, 2005, pp. 1-15.

EMC, "EMC VNX Replication Technologies: An Overview, Abstract: This white paper highlights the VNX replication technologies. It provides information on EMC, MirrorView, VNX Replicator, RecoverPoint, Replication Manager, Symmetrix, Remote Data Facility (SRDF), and VPLEX", Nov. 2015, pp. 1-34.

Mell et al., "The NIST Definition of Cloud Computing," National Institute of Standards and Technology, U.S. Department of Commerce, Special Publication 800-145, Sep. 2011, pp. 1-7.

Rostagni et al., U.S. Appl. No. 15/598,362, filed on May 18, 2017, titled "Collision Detection at Multi-Node Storage Sites,", pp. 1-50.

IBM: List of IBM Patents or Patent Applications treated as related (Appendix P), Feb. 5, 2018, pp. 1-2.

Rostagni et al., U.S. Appl. No. 15/888,307, filed Feb. 5, 2018, titled "Collision Detection at Multi-Node Storage Sites,", pp. 1-40.

* cited by examiner

HANDLING NODE FAILURE IN MULTI-NODE DATA STORAGE SYSTEMS

BACKGROUND

The present disclosure relates to replicating data in data storage systems, and more particularly to preventing inconsistent backup copies of data volumes following node failure in data storage systems having multiple nodes at each storage site.

In data storage systems, it is often useful to have stored data replicated in multiple locations so that the data is backed up and available locally in each of the locations. Each location will have a local data storage device, which can satisfy requests to read data independently. However, requests to write data need to be distributed to each location, so that they can be applied in a consistent fashion. In particular, if multiple write requests are made to a particular region of storage, such as a block, sector or page of data in the storage, the writes must be applied in the same order by each local data storage device, otherwise the data stored it each local data storage device will be inconsistent. When write requests are received, which potentially may not be applied in the same order on different local storage devices, this is known as a "write collision".

A known solution to write collisions is to use one location to process write requests made to any of the locations, and distribute the results of that processing to the other locations, so that the data in each location is consistent. However, this means that for any location other than the location that processes the write requests, the time taken to complete a write request will be at least two times the round-trip-time between the locations.

SUMMARY

According to an aspect of the present disclosure, a computer implemented method is provided. The method is performed in a multi-node storage system comprising a first data storage system having an owner node and a backup node in a first location, and a second data storage system having an owner node and a backup node in a second location. The first data storage system is communicatively coupled to the second data storage system. Each of the first and second data storage systems includes a copy of the same data volume. The method detects failure of a node of the multi-node data storage system. The method identifies an outstanding write request to the first data storage system. If the failed node is the owner node of the first data storage system, the method determines whether the outstanding write request corresponds to a host write to the backup node of the first data storage system. If the outstanding write request corresponds to a host write to the backup node of the first location, the method sends a retransmission message of the outstanding write request to a node of the second data storage system. The retransmission message comprises an indicator that the write request is a retransmission, the data to be written and the region in the data volume where the data is to be written. If the outstanding write request does not correspond to a host write to the backup node of the first data storage system, the method reads the data region associated with the outstanding write request from the first data storage system, and sends a resynchronization message to a node of the second data storage system. The resynchronization message comprises an indicator that the write request is a resynchronization, the data read from the first data storage system to be written and the region in the data volume where the data is to be written.

According to another aspect of the present disclosure, a computer implemented method is provided. The method is performed in a multi-node storage system comprising a first data storage system having an owner node and a backup node in a first location, and a second data storage system having an owner node and a backup node in a second location. The first data storage system is communicatively coupled to the second data storage system. Each of the first and second data storage systems includes a copy of the same data volume. The method detects failure of a node of the multi-node data storage system, wherein the failed node is the owner node of one of the first and second data storage systems. The method identifies an outstanding write request to the first data storage system. If the failed node is the owner node of the second data storage system, the method sends a retransmission message of the outstanding write request to the backup node of the second data storage system. If the failed node is the backup node of the first data storage system and the outstanding write request corresponds to a host write to the owner node of the first data storage system, the method sends a retransmission message of the outstanding write request to a node of the second data storage system. If the failed node is the backup node of the second data storage system, the method sends a retransmission message of the outstanding write request to the owner node of the second data storage system. The retransmission message comprises an indicator that the write request is a retransmission, the data to be written and the region in the data volume where the data is to be written.

According to yet another aspect of the present disclosure, a computer implemented method is provided. The method is performed in a multi-node storage system comprising a first data storage system having an owner node and a backup node in a first location, and a second data storage system having an owner node and a backup node in a second location. The first data storage system is communicatively coupled to the second data storage system. Each of the first and second data storage systems includes a copy of the same data volume. The method receives a write request message, wherein the type of write request message comprises one of a resynchronization message and a retransmission message sent following failure of a node of the multi-node data storage system. The write request message is received by the second data storage system from the first data storage system and comprises an indicator of the message type, the data to be written and the region in the data volume where the data is to be written. The method determines whether there is an outstanding write request to the second data storage system that corresponds to the region of the data volume in the received message. If there is an outstanding write request to the first data storage system that corresponds to the region of the data volume in the received message, the method determines whether the write of the received write request message is the same type as the outstanding write request. If the write of the received write request message is the same type as the outstanding write request, the method writes the data associated with a predetermined one of the first and second data storage systems to the region in the data volume of the second data storage system last. If the write of the received write request message is not the same type as the outstanding write request, the method writes the data associated with the retransmission message to the region in the data volume of the second data storage system after writing the data associated with the resynchronization message.

According to yet another aspect of the present disclosure, a multi-node data storage system is provided. The storage system comprises a first data storage system having an owner node and a backup node in a first location, and a second data storage system having an owner node and a backup node in a second location. The first data storage system is communicatively coupled to the second data storage system. Each of the first and second data storage systems includes a copy of the same data volume. At least one node of the multi-node data storage system is configured to perform the method of any one or more of the above aspects of the present disclosure.

According to yet another aspect of the present disclosure, a computer program product is provided. The computer program product is for use in a multi-node storage system comprising a first data storage system having an owner node and a backup node in a first location, and a second data storage system having an owner node and a backup node in a second location. The first data storage system is communicatively coupled to the second data storage system. Each of the first and second data storage systems includes a copy of the same data volume. The computer program product comprises a computer readable storage medium, and program instructions embodied therewith. The program instructions are executable by a processor to perform the method of any one or more of the above aspects of the present disclosure.

BRIEF DESCRIPTION OF THE SEVERAL VIEWS OF THE DRAWINGS

Example implementations of the present disclosure will be described below with reference to the following drawings, in which.

DETAILED DESCRIPTION

In data storage systems, it is often useful to have stored data replicated in multiple locations or sites so that the data is available locally in each of the locations. Each location has one or more local data storage devices storing one or more data volumes. The data volumes in the local data storage device(s) may be accessed by a node, designated as an "owner node", which can satisfy requests (e.g., from a host system) to read data independently (i.e., without needing to query other data storage devices of the data storage system). Each location may have an additional node, designated as the "backup node", which also provides access to the data volumes in the local data storage devices. As the skilled person will appreciate, the owner node and backup node may be interchangeably designated as the "owner node" and "backup node" for different data volumes. The owner node and the backup node in each location are referred to herein as a "high availability pair", which together provide dual access points for data reads and writes by a host system for increased system performance. In addition, each node of the high availability pair typically comprises a redundant set of write cache data for improved resiliency. The owner node in each location holds the canonical version of the record of outstanding data writes and is responsible for in-site ordering of data writes to the same storage regions of the data volumes submitted from a host system. In example implementations, the owner node is also responsible for collision detection and resolution of writes to the same storage regions of the data volumes originating from a remote site. Thus, the owner node in each site ensures the data stored in each local data storage device is consistent.

Figure 1:
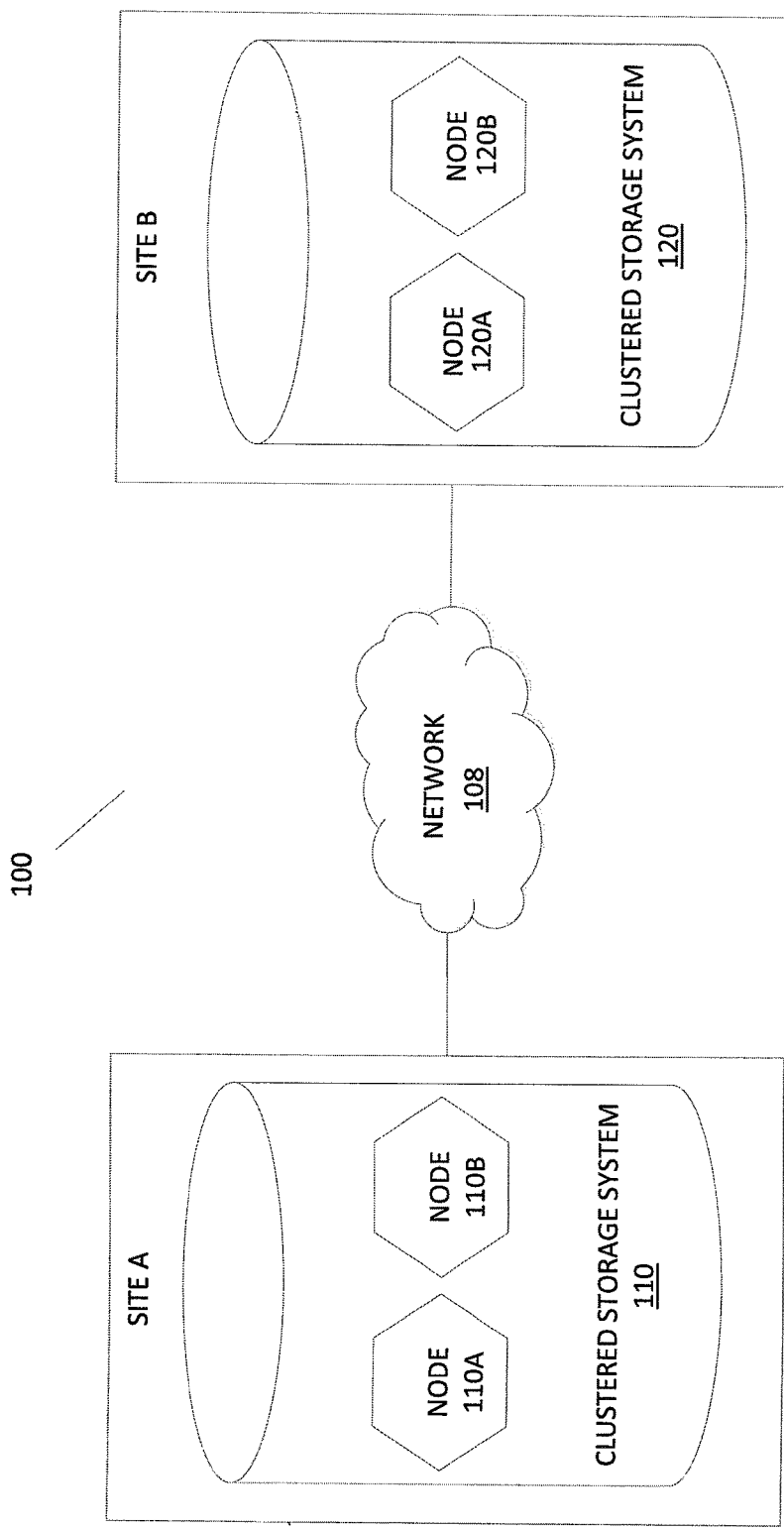
FIG. 1 is a block diagram of a multi-node data storage system, in accordance with example implementations of the present disclosure.

FIG. 1 shows a multi-node data storage system 100 in accordance with example implementations of the present disclosure. Data storage system 100 comprises distributed data storage devices in multiple locations or sites connected to a data communications network 108. In particular, a first clustered storage system 110 at a first location "site A" and a second clustered storage system 120 at a second location "site B" are connected by data communications network 108. Each of the first and second data storage systems 110, 120 comprises one or more local storage devices (i.e., physical storage) which store data volumes that are replicated at both sites A and B. Data communications network 108 may comprise any suitable network comprising hardware, software and firmware utilizing associated communication protocols, for enabling the communication of data between the first and second locations. For example, network 108 may comprise a wired or wireless local area network (LAN), a wide area network (WAN) or the Internet.

As shown in FIG. 1, first clustered storage system 110 at site A comprises first node 110A and second node 110B, which process input and output (IO), such as a read or a write from a host system (not shown), to the volumes of data contained in the storage system 110. Similarly, second clustered storage system 120 at site B comprises first node 120A and second node 120B, which process input and output (IO) to the volumes of data contained in the storage system 120. Nodes of site A are in communication with nodes of site B via network 108 so that the data volumes stored on first clustered storage system 110 is replicated to second clustered storage system 120 and vice versa. Each node in site A or B can act as a backup for the other node in the site, by replicating metadata and caching host writes that are not yet committed to physical storage, thus providing a highly available state that is effectively non-volatile. Thus, the first and second nodes 110A and 110B in site A may be referred to as a first high-availability pair, and the first and second nodes 220A and 220B in site B may be referred to as a second high-availability pair.

For each IO received at site A or site B from a host system, the node of the high-availability pair which receives the JO is called the "processing node", while the other node of the high-availability pair is called the "partner node". For example, if an JO submitted to first clustered storage system 110 is received by node 110A from the host system at site A, then node 110A is the processing node for the JO at site A while node 110B is the partner node.

As described above, for each data volume, one node of the high-availability pair in each site is designated as an "owner node" whilst the other node is designated as the "backup node". For example, for a data volume, if node 110A is designated as the owner node at site A, then node 110B is designated as the backup node for site A, and vice versa. The owner node maintains a record comprising a canonical view or version of outstanding IOs for the data volume, suitable for ensuring collision detection for all ongoing writes for that volume at that site. The backup node maintains a record comprising a less exact view or version of outstanding IOs for the data volume, suitable for error recovery should the owner node fail.

In view of the above, the skilled person will appreciate that, in each of sites A and B, processing nodes and partner nodes are mutually exclusive for a given JO; meaning a node cannot act as both simultaneously. Similarly, in each site, owner nodes and backup nodes are mutually exclusive for a given volume; meaning a node cannot simultaneously act as both the owner node and the backup node. However, depending on which node of a site receives an IO from a host system, it is possible for either the owner node or the backup node to act as the processing node. For example, if node 110A of site A is designated as the owner node of volume A and receives a host write to volume A, then node 110A is the processing node and the owner node for the IO. Conversely, in the same example, if node 110B of site A is designated as the backup node of volume A and receives a host write to volume A, then node 110B is the processing node and the backup node for the IO. The skilled person will further appreciate that a high-availability pair of nodes, comprising a processing node and a partner node, may be responsible for many data volumes, and each volume is handled by only one pair of nodes in each site (i.e., as the owner node). While the following example implementations will exemplify processing of IO on a single data volume, it should be noted that the disclosure applies equally to many volumes on one or more pairs of nodes in each site.

In accordance with example implementations of the present disclosure, messages are transmitted between first and second clustered storage systems 110, 120 for the replication of data in the corresponding data volumes. In particular, messages transmitted between first clustered storage system 110 and second clustered storage system 120 are considered in order, meaning that messages sent in a particular order from a transmitting device will be processed in the same order by the receiving device. Situations in which a previously sent message is overtaken by a more recently sent message during communication are not contemplated in the present disclosure.

In accordance with example implementations of the present disclosure, site A or site B is chosen or predetermined as the "leader", meaning it has its writes applied last in these event of a "write collision", and the other site is the "follower". Thus, in the event of a write collision, the colliding write to the predetermined "leader" site is the data that ends up on the physical storage on each site, and thus may overwrite data written by the other colliding write to the "follower" site. In the following description, and by way of example only, site A is chosen as the leader site and site B is the follower site. Moreover, in the following description, the term "local site" for a given IO corresponds to the site having the node to which the IO was submitted by the host system, whilst the term "remote site" corresponds to the other site.

In accordance with example implementations of the present disclosure, when a host write is initially received at a local site, both nodes at the local site record the existence of the write (e.g., in the abovementioned record for tracking outstanding writes) before it is committed to local storage or transmitted to the remote site. In particular, the processing node retrieves metadata for the host write, for example a volume index, start logical block addressing (LBA), and a length (e.g., in blocks). The processing node may then transmit the metadata to the partner node. Depending on the communication protocol being used for IOs, this may be performed without significantly increasing latency. For example, the metadata may be transmitted during the data transfer phase of the small computer system interface (SCSI) write protocol used in Fiber Channel and iSCSI-based storage environments.

Figure 2:
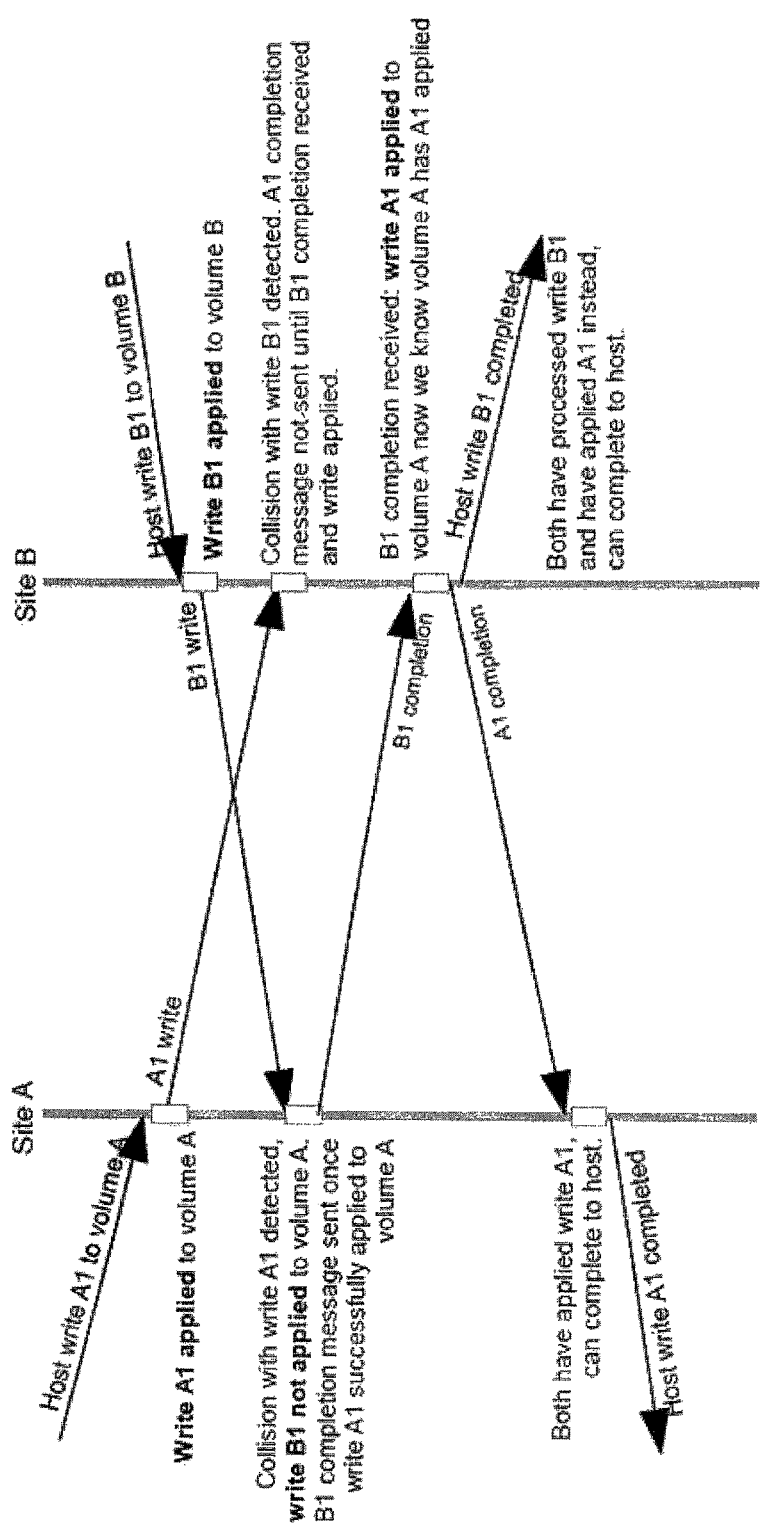
FIG. 2 is a schematic diagram illustrating a method for handling write collisions at two sites of a data storage system.

FIG. 2 illustrates the handling of write collisions between two sites, site A and site B, of a data storage system. For ease of illustration, FIG. 2 shows only a single node at each site A and B.

As shown in FIG. 2, host write A1 is received at site A and is applied to volume A in first clustered storage system 110. Site A then sends host write A1 in a message "A1 write" to site B for replication of the data in volume B of second clustered storage system 120. At this time, write A1 is applied on local site A, but is not "completed" (i.e., confirmed to the host system) until receiving confirmation that write A1 has been successfully written on the remote site B. Thus, until receiving a message "A1 completion" message from remote site B, write A1 is recorded and tracked as an outstanding write at site A.

Prior to receiving the A1 write message from site A, site B receives host write B1 to volume B and applies host write B1 to volume B. Still prior to receiving the A1 write message from site A, site B sends the B1 write message to first clustered storage system 110 at site A for replication of the data in volume A of first clustered storage system 110. Write B1 is recorded and tracked as an outstanding write at site B, until receiving a "B1 completion" message from remote site A.

Subsequently, site B receives the A1 write message, and, in response, determines that there is a write collision with the outstanding write B1. Similarly, site A receives the B1 write message, and, in response, determines that there is a write collision with outstanding write A1. Note that because the data storage system described herein pertains only to systems which implement in-order messaging, a write collision is only detected either by both sites A and B or by neither of sites A and B.

In the example illustrated by FIG. 2, at this stage, both sites A and B have detected a write collision; site A has applied (or started to apply) host write A1 and site B has applied (or started to apply) host write B1. Since site A is designated as the leader (i.e., writes to first clustered storage system 110 at site A are the last writes to be applied in the event of a write collision), site A disregards the B1 write message and continues to apply host write A1 (as necessary), before sending B1 completion message to site B. B1 completion message indicates that site A has applied host write A1 (instead of write B1). Site A receives the B1 completion message from site A, and site B applies write A1 to volume B (i.e., overwriting write B1), knowing that the same write is being applied at both sites A and B. Site B then send A1 completion message to site A. Site A then sends a "host write A1 completed" message to the corresponding host system, and site B sends "host write B1 completed" message to the corresponding host system.

As the skilled person will appreciate, in a data storage system implementing the method of FIG. 2, the write latency to the host system corresponds to one round-trip time between the two sites A and B in the case of no write collision, and increases by a further round-trip time between the sites when a write collision occurs.

Co-pending U.S. patent application Ser. No. 15/598,362 entitled "Collision Detection at Multi-Node Storage Sites" filed 18 May 2017, proposes techniques for collision detection in a multi-node system, comprising an owner node and a backup node at each site. For example, in the multi-node system of FIG. 1, nodes 110A and 110B comprise the owner node and backup node, respectively, at site A, and nodes 120A and 120B comprise the owner node and backup node, respectively, at site B. The proposed techniques ensure that a host write to site A or site B, with either the owner node or the backup node of the high-availability pair as the processing node, is known about and recorded by both nodes before the write is applied to the local storage and before the write is sent to the remote site for replication. This is achieved by obtaining a lock of the local data region corresponding to the host write request received by the processing node, and tracking each outstanding write on both nodes at the local site. In particular, the owner node maintains a canonical view of outstanding IOs for the data volume, and is responsible for collision detection for all ongoing writes for the site, whilst the backup node maintains a less exact view of outstanding IOs for the data volume, comprising only metadata for ongoing writes.

Figure 3:
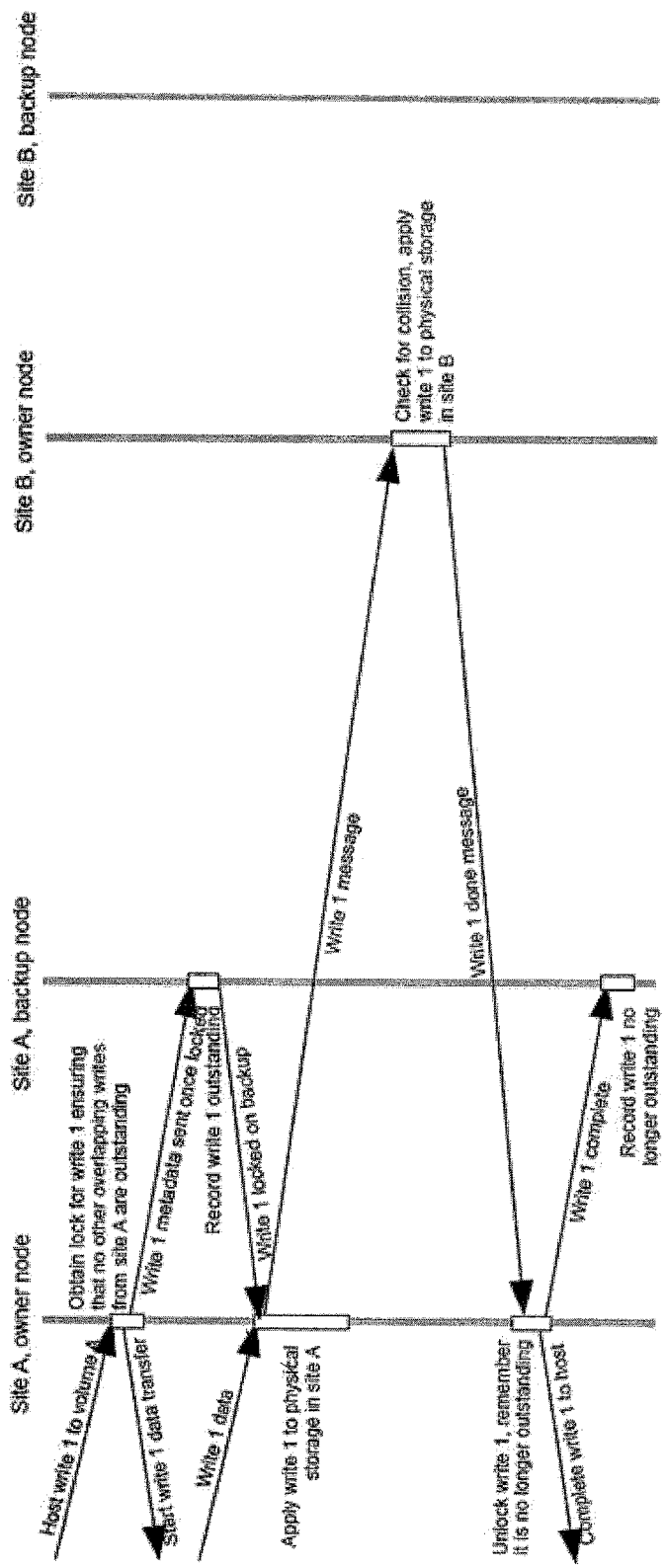
FIG. 3 is a schematic diagram illustrating an example method for handling write collisions at two sites of the multi-node data storage system of FIG. 1, where the processing node is an owner node.
Figure 4:
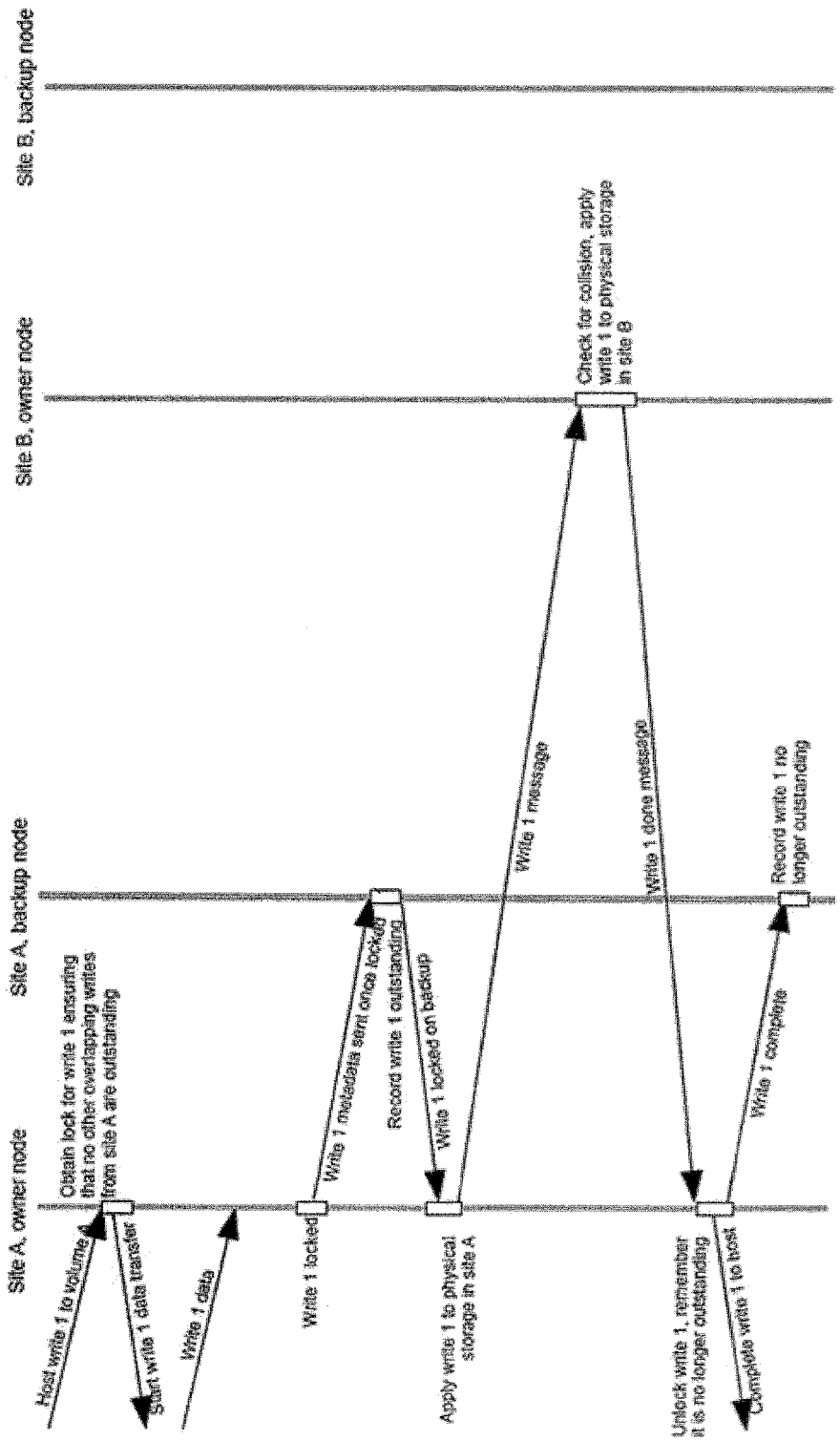
FIG. 4 is a schematic diagram illustrating another example method for handling write collisions at two sites of the multi-node data storage system of FIG. 1, where the processing node is a backup node.

For example, FIG. 3 illustrates write collision detection and handling in a situation where the owner node at site A is the processing node, which receives a host write to volume A, and FIG. 4 illustrates write collision detection and handling in the situation where the backup node at site A is the processing node, which receives the host write to volume A. These techniques ensure consistency between the volumes at site A and site B. For brevity, the processes shown in FIGS. 3 and 4 are not described in detail herein. Further details can be found in the above referenced co-pending U.S. patent application Ser. No. 15/598,362.

The use of a multi-node system comprising a high-availability pair of nodes (i.e., owner node and backup node) at each site of a distributed data storage system provides increased resilience in the event of node failure. In particular, if one node in the high-availability pair fails, then the other node remains available for IO. The present disclosure concerns techniques for efficiently handling node failure. In particular, the present disclosure provides for continued operation of the data storage system (including maintaining data consistency through replication) without the failed node. The present disclosure further provides for efficient recovery from node failure, following restoration of the failed node, so that data continuity is maintained on the local and remote sites. The disclosed techniques minimize write latency and thus enhance system resilience and efficiency.

For the purposes of the present disclosure, a number of assumptions are made. In particular, it is assumed that if there is a failure of all nodes at a local site (or a failure of connectivity between sites) only one data copy (i.e., at the remote site) continues to change. Thus, in this situation, there is no need to continue with collision detection and handling. The surviving remote site will typically continue to record writes applied to its data storage, for example using a bitmap, for use in a site-to-site resynchronization procedure following restoration of the failed local site, to ensure consistency of data. The particulars of such a site-to-site resynchronization procedure are not dealt with in the present disclosure. Thus, scenarios involving node failure of all nodes at a site are not contemplated by the present disclosure.

The handling of, and recovery from, a single node failure at one site is dependent upon several factors. In particular, the location, designation and function of the failed node in relation to an outstanding write, at the time of the node failure (i.e., when the node goes "offline"). For example, the failed node may be the target node (e.g., owner node) of a host write to a remote site, or a processing node (e.g., owner node or backup node) of a write to a local site. Accordingly, the handling of node failure falls into different categories, dependent upon these factors. Certain categories of node failure handling are described below as example implementations, for the purposes of illustrating the principles of the present disclosure. As the skilled person will appreciate, in other example implementations, the described processes can be adapted for other categories, using the same or similar principles.

The processes of the example implementations described below are triggered by the determination of the node failure by one or more surviving nodes in a multi-node storage system comprising multiple sites. Techniques for determining a node failure are known in the art, and form part of the conventional processes for managing clustered data storage systems. As the skilled person will appreciated, any suitable technique may be used to discover a node failure (i.e., that a participating node has gone offline) in conjunction with the present disclosure, whether now known or developed in the future. In the example implementations described below, it is assumed that all surviving nodes in the storage system discover, or have time to discover, the node failure before processing is initiated.

For ease of description, the following example implementations assume that the messages are sent and received in the same order, and the owner node at each site is preferentially responsible for sending and receiving messages related to writes, as described above and illustrated in FIGS. 3 and 4.

Owner Node Fails on Source Site

Figure 5:
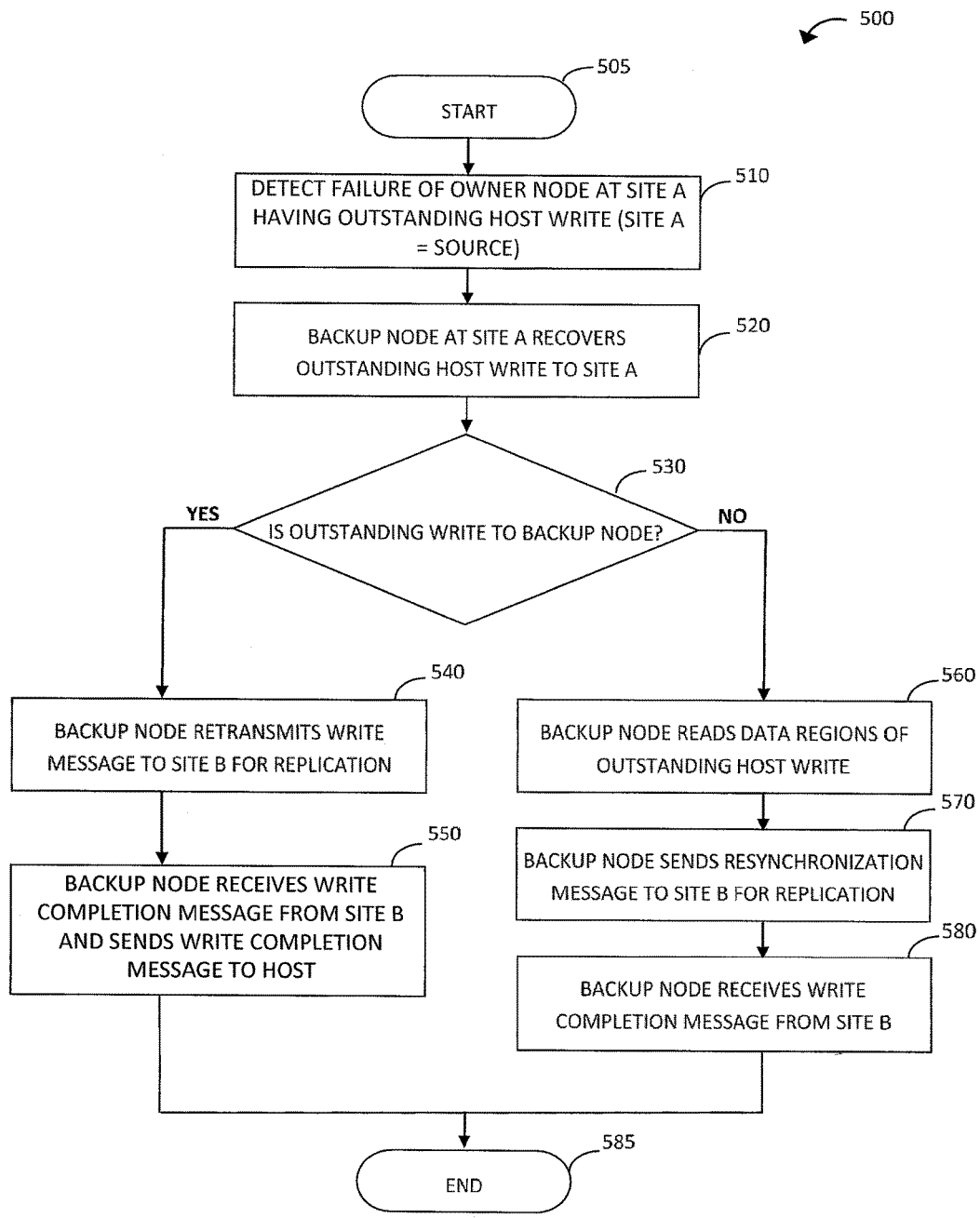
FIG. 5 is a flow diagram illustrating an example method for handling node failure in the multi-node storage system of FIG. 1, in accordance with example implementations of the present disclosure.

FIG. 5 is a flowchart of a method 500 in accordance with an example implementation of the present disclosure. In the example illustrated in FIG. 5, the owner node of the first data storage system at site A goes offline during an outstanding host write to site A. In this case, site A may be referred to as the "source site" of the outstanding write, and site B may be referred to as the "target site". Thus, in this category of node failure, the failed node is the owner node of the source site of an outstanding write, and the backup node of the source site is the surviving node. The method 500 of FIG. 5 is performed by the system at site A where the owner node has failed, typically by the surviving backup node.

The method 500 starts at step 505. At step 510 the method detects a failure of the owner node at site A, where there is an outstanding host write to site A. Step 510 may wait a predetermined time interval after detection of the node failure, for example to allow all other participating nodes to discover the node failure, before proceeding to step 520. By virtue of the tracking of hosts writes, as described above with reference to FIGS. 3 and 4, the surviving backup node is aware of all outstanding writes, but does not know whether the outstanding write has reached the target node at site B for replication or whether it has collided with other writes.

At step 520, the backup node identifies and recovers the outstanding host write to site A, for example, from a record of outstanding host writes. At step 530 determines whether the outstanding host write is a write to the backup node. If step 530 determines that the outstanding host write was a write to the backup node, then the backup node will have a record of the write data from the host, and so at step 540 sends a write request message to site B (herein referred to as "retransmission message"). The retransmission message is marked or otherwise indicated as a retransmission of a previous write request message, and includes the data to be written and its location, as with a write request message as described above with reference to FIG. 2. Following step 540, at step 550 the backup node receives a write completion message from site B indicating that the data has been successfully written in accordance with the retransmission message (herein called a "replication write completion message") and sends a write completion message to the host (herein called a "host write completion message"), accordingly. As the skilled person will appreciate, appropriate forms for the replication write completion message and the host write completion message are well known in the art and any suitable message is contemplated by the present disclosure. The method then ends at step 585.

Alternatively, if step 530 determines that the outstanding host write was a write to the owner node, then the backup node will only have a record of the metadata associated with the host write, in particular identifying the region of the data volume, and will not have the write data from the host. In this case, the method proceeds to step 560, which reads or "re-reads" the data region associated with the host write. As the skilled person will appreciate, if the owner node committed the host write data to storage before it failed, step 560 retrieves the write data from the data volume; otherwise step 560 retrieves data from the data region of the volume at a state prior to the host write. In either case, the backup node retrieves data from the region of the data volume for replication to site B to ensure that the state of the data is consistent at both sites A and B, and the method proceeds to step 570.

Step 570 sends a write request message to site B with the data that was re-read in step 560 (herein referred to as "resynchronization message"). The resynchronization message is marked or otherwise indicated as a "resynchronization" of the data regions associated with the previous write request message, and includes the data to be written and its location.

Following step 570, the method proceeds to step 580, which receives a replication write completion message from site B, indicating that the data has been successfully written in accordance with the resynchronization message. Thus, the data regions associated with the write message in question are now consistent. However, as the processing node was the owner node that failed, no additional notification needs to be provided to the host. The method then ends at step 585.

As the skilled person will appreciate, the method of FIG. 5 comprises: (i) the retransmission of an outstanding write including the data written by the host, in the attempt to roll-forward the in-progress write, or (ii) the resynchronization of a region of a volume that includes the location of an outstanding write, when the specific data for the write is not available (because the failed node holds that data). Resynchronization may either roll-forward the write, in the case that the physical storage had already been updated at the point of the node failure, or roll-back the write, in the case where that physical storage had not yet been written. In either case, the method 500 ensures that state of the data volumes at both sites A and B will be consistent.

Backup Node Fails at Source Site

As the skilled person will appreciate, the method 500 of FIG. 5 may also be used when the backup node of the first data storage system at site A goes offline during an outstanding host write to site A. In this category of node failure, the failed node is the backup node of the source site of an outstanding write, and the owner node of the source site is the surviving node. The method 500 is performed by the system at site A where the backup node has failed, typically by the surviving owner node. Thus, in this category of node failure, the owner node at site A performs steps 520 to 580, instead of the backup node as described above and illustrated in FIG. 5. Step 510 detects failure of the backup node at site A, and step 530 determines whether the outstanding write is to the owner node. Retransmission may be performed using steps 540 and 550 when the outstanding write is to the owner node, and resynchronization may be performed using steps 560, 570 and 580 when the outstanding write is to the backup node. In some example implementations, the owner node does not perform resynchronization steps 560, 570 and 580 when the backup node fails. In some example implementations, the owner node waits for a replication write completion message, associated with the original write request, from site B before performing retransmission steps 540 and 550.

The manner in which the target node of site B handles the retransmission message sent in step 540 of the method 500 of FIG. 5 or the resynchronization message sent in step 570 of the method 500 of FIG. 5 is described further below with reference to FIG. 7.

Owner Node Fails on Target Site

Figure 6:
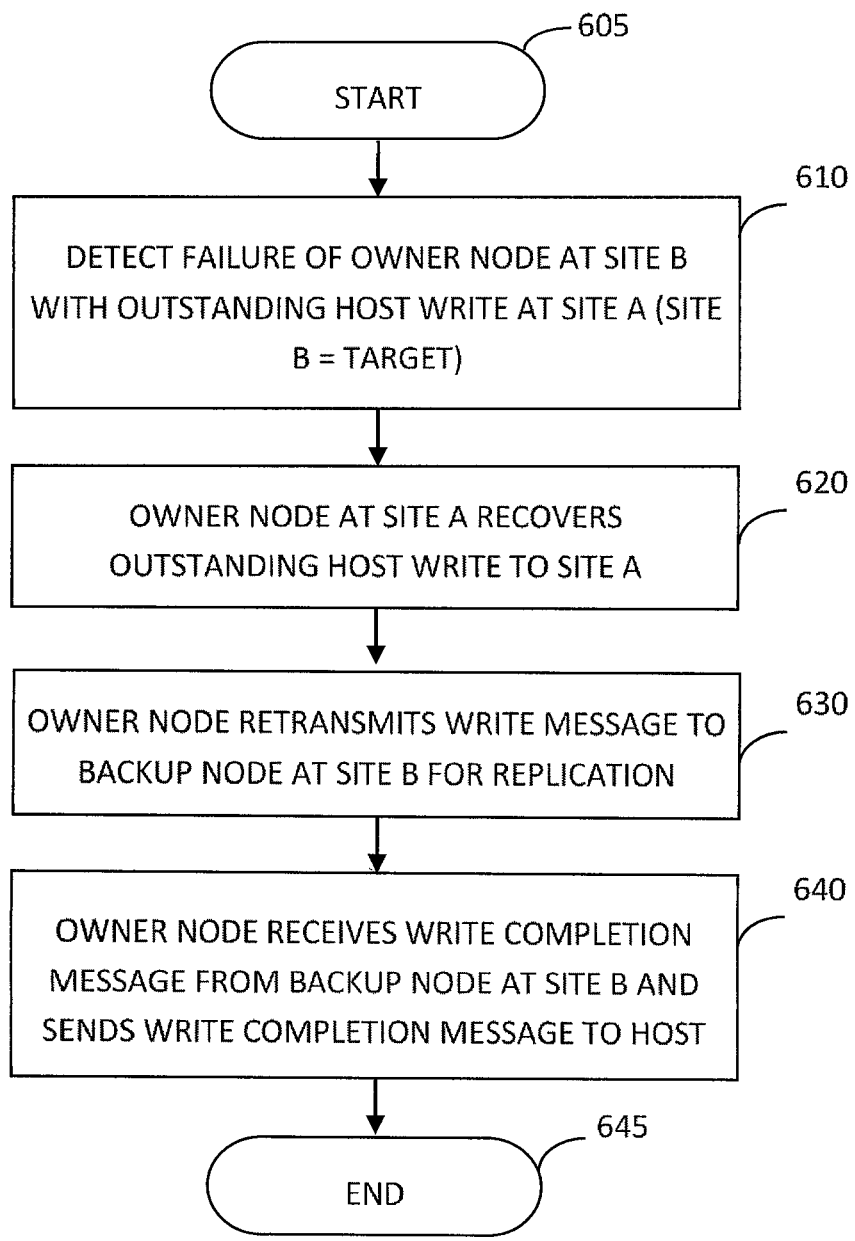
FIG. 6 is a flow diagram illustrating another example method for handling node failure in the multi-node storage system of FIG. 1, in accordance with example implementations of the present disclosure.

FIG. 6 is a flowchart of a method 600 in accordance with an example implementation of the present disclosure. In the example illustrated in FIG. 6, the owner node of the second data storage system at site B goes offline during an outstanding host write to site A. As in the example of FIG. 5, site A may be referred to as the "source site" of the outstanding write, and site B may be referred to as the "target site". Thus, in this category of node failure, the failed node is the owner node of the target site of an outstanding write, and the backup node of the target site is the surviving node. The method 600 of FIG. 6 is performed by the system at site A, such as by the owner node at site A.

The method starts at step 605. At step 610, the method detects a failure of the owner node at site B, where there is an outstanding host write to site A. Step 610 may wait a predetermined time interval after detection of the node failure, for example to allow all other nodes to discover the node failure, before proceeding to step 620. By virtue of the tracking of hosts writes, as described above with reference to FIGS. 3 and 4, the owner node at site A is aware of all outstanding writes, but does not know whether the outstanding write has reached the target node B for replication or whether it has collided with other writes.

At step 620, the owner node at site A identifies and recovers the outstanding host write to site A. In particular, the owner node will have a record of the write data from the host for all outstanding host writes to site A, and so at step 630 sends a write request message to the backup node at site B (herein referred to as "retransmission message"). The retransmission message is marked as a retransmission of the previous write request message (to the failed owner node), and includes the data to be written and its location, as described above.

At step 640, the method receives a replication write completion message from the surviving backup node in site B, indicating that the data has been successfully written in accordance with the retransmission message, and, optionally, sends a host write completion message to the host, accordingly. The method then ends at step 645.

Backup Node Fails on Target Site

As the skilled person will appreciate, the method 600 of FIG. 6 may also be used when the backup node of the second data storage system at site B goes offline during an outstanding host write to site A. In this category of node failure, the failed node is the backup node of the target site of an outstanding write, and the owner node of the target site is the surviving node. The method 600 is performed by the system at site A. Step 610 detects failure of the backup node at site B, and step 640 receives a replication write completion message from the surviving owner node at site B, in response to the transmission message sent at step 630. In some example implementations, the node at site A waits for a replication write completion message, associated with the original write request, from site B before performing retransmission steps 630 and 640.

The manner in which the surviving node of the target site B handles the retransmission message sent in step 630 of the method 600 of FIG. 6 is described further below with reference to FIG. 7.

Handling Collisions with Retransmission and Resynchronization Messages

A problem associated with the handling of retransmission and resynchronization messages, as described above, is that outstanding writes may include "colliding writes", where the storage systems at both sites A and B are attempting to replicate data to the other system for a common region of the data volume. In particular, as the skilled person will appreciate, hosts submitting writes to a data volume of the storage systems of both sites A and B will lead to writes flowing in both directions. Thus, at the time of a node failure, the outstanding writes typically will include host writes to both sites A and B, and thus the failing node will be considered to be in the source system for a subset of currently-outstanding writes, and the target system for the remainder of currently-outstanding writes. In the case that the outstanding writes include host writes to the same data region for both sites A and B, a write collision will occur. Co-pending U.S. patent application Ser. No. 14/871,068 entitled "Replicating Data in a Data Storage System" filed 30 Sep. 2015 describes a technique for resolving collisions in the normal, steady-state case, where there are no node failures. This technique is briefly described above with reference to FIG. 2. The present disclosure concerns resolving collisions in the more complex scenario, when write data is retransmitted following a node failure, for example as described above with reference to FIGS. 5 and 6.

An additional problem is that when a host gets a successful completion message for a host write back from the storage system, reading back the region written to can only give the data written by the host system, or by another host system if the write collided with another (i.e., they were submitted simultaneously to the same region of a volume by host systems attached to the two storage systems). It is not acceptable for the data to have reverted back to the state it was before the successful host write was submitted. This becomes an issue if a node fails while colliding writes are outstanding, and one storage system retransmits its data, while the other is unable to retransmit its data and has to resynchronize using the physical data stored on its site. In accordance with example implementations of the present disclosure, methods of handling retransmission and resynchronization messages ensure that a resynchronization cannot undo a successfully completed host write (e.g., following retransmission).

Table 1 below shows how a node receiving a retransmission or resynchronization message handles collisions (i.e., colliding outstanding writes). In Table 1, the "source" system is associated with the node receiving the write message (i.e., receiving the retransmission or resynchronization message as in FIG. 5 or 6), and the "target" system is the other system.

TABLE 1

| | | Outstanding write from source system | | |
|---|---|---|---|---|
| | | Nothing | Retransmission | Resynchronization |
| Received write from target system | Nothing | N/A | Retransmission continues as normal | Resynchronization continues as normal |
| | Retransmission | Retransmission applied to storage | Write submitted to previously determined storage system applied second | Retransmission applied second |
| | Resynchronization | Resynchronization applied to storage | Retransmission applied second | Write submitted to previously determined storage system applied second |

In Table 1, columns represent whether a write is outstanding that collides with the received write, and, if so, the kind or "type" of outstanding write, while rows represent the kind or "type" of received write. The "nothing" rows and columns indicate the situation where there is no collision. In accordance with example implementations of the present disclosure, one of the storage systems is previously determined as the "leader" and the other storage system is predetermined as the "follower". For example, as described above, in the example shown in FIG. 1, site A is the leader and site B is the follower. As shown in Table 1, in the case of two colliding resynchronization messages or two colliding retransmission messages, the host write submitted to the storage system of the leader site is applied last (i.e., the retransmission or resynchronization from the predetermined storage system is logically applied second). In addition, in accordance with example implementations, in the case of a resynchronization message colliding with a retransmission message, the host write associated with the retransmission message is applied last (i.e., the retransmission is logically applied second).

Accordingly, as shown in the first column of Table 1, if the received write does not collide with an outstanding write, the source site applies the data contained in the retransmission or resynchronization message (as appropriate), and returns a (replication) write completion message to the target site, as described above with reference to FIGS. 5 and 6.

However, as shown in the second and third columns of Table 1, if there is an outstanding write, the source site decides the order to apply the received write and the outstanding write dependent on the kind of writes (retransmission or resynchronization), as described above. If the received write is a retransmission, then when the outstanding write is also a retransmission, the write submitted to the previously determined (i.e., leader) site is applied second, whereas when the outstanding write is a resynchronization, the retransmission is applied second, as shown in the second row of Table 1. If the received write is a resynchronization, then when the outstanding write is a retransmission, the retransmission is applied second, whereas when the outstanding write is also a resynchronization, the write of the previously determined (i.e., leader) site is applied second, as shown in the third row of Table 1.

Figure 7:
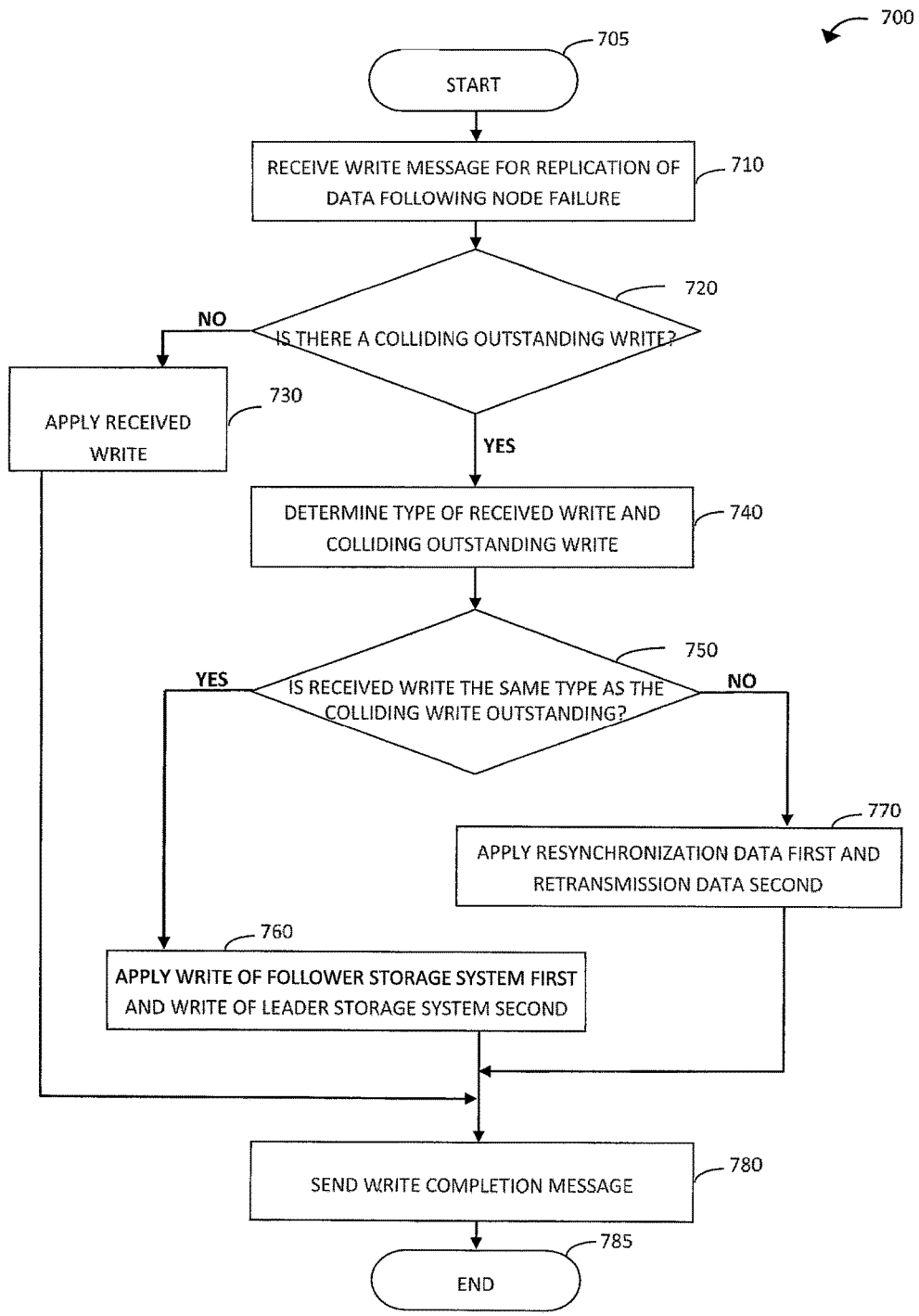
FIG. 7 is a flow diagram illustrating another example method for handling node failure in the multi-node storage system of FIG. 1, in accordance with example implementations of the present disclosure.

FIG. 7 is a flowchart of a method 700 in accordance with an example implementation of the present disclosure. In particular, the method 700 is performed by a node of a data storage system at a site (e.g., owner node or surviving backup node in a site, which may be either site A or site B) receiving a retransmission or resynchronization request message from the other site following a node failure, as described above. The method follows the principles described above with reference to Table 1.

The method 700 starts at step 705. At step 710, the method receives a write message for replication of data following a node failure. In particular, a resynchronization message or a retransmission message may be received, as described above. At step 720, the method determines whether there are any outstanding host writes that collide with the received write. For example, step 720 may compare the identifier of the data region indicated in the received write with identifiers of regions of its tracked outstanding host writes, and determine if there is a match or overlap.

If step 720 determines that there is no colliding write, the method proceeds to step 730. Step 730 applies the received write. In particular, the data contained in the received resynchronization or retransmission message is applied to the region of the data volume specified therein. The method then continues with step 780 as described below.

If step 720 determines that there is a colliding write, the method proceeds to step 740. Step 740 determines the type of received write and the type of colliding outstanding host write. In particular, step 740 determines whether the received write is a retransmission or a resynchronization, and whether the outstanding host write requires retransmission or resynchronization. The method then proceeds to step 750.

At step 750, the method determines whether the received write is the same type as the colliding outstanding host writes. If step 750 determines that the received write and the colliding outstanding write are the same type (i.e., both resynchronization or both retransmission), the method proceeds to step 760. At step 760, the method applies the write for the chosen or predetermined "leader" storage system last, so that the data associated with the write to the leader site ends up on both sites and is not overwritten. In particular, step 760 applies the write of the follower storage system first, and applies the write of the leader storage system second. The method then proceeds to step 780.

However, if step 750 determines that the received write and the colliding outstanding write are not the same type (i.e., one write is resynchronization and the other write is retransmission), the method proceeds to step 770. At step 770, the method applies the write of the retransmission last, so that the resynchronization data does not undo the write of the retransmission. In particular, step 770 applies the write of the resynchronization first, and applies the write of the retransmission second. The method then proceeds to step 780.

Following one of the above described steps 730, 760 and 770, step 780 sends a write complete message to the other site (e.g., a "replication write complete message" as received in step 550 or 580 of FIG. 5 or step 640 of FIG. 6). The method then ends at step 785.

Processes for handling node failure in a multi-node active-active (i.e., bidirectional) data storage system, in accordance with example implementations of the present disclosure, have a number of advantages. In particular, following failure of one node, each remaining node in the data storage system can resolve collisions using the same processes, without the need for additional communications between sites. Thus, outstanding writes at the time of the node failure can be committed to storage appropriately (e.g., in the correct order) at each site, so as to ensure that the data volumes at each site remain consistent, with minimal latency. By minimizing the communications between the data storage systems and modifying existing messages (e.g., using a retransmission or resynchronization indicator in a write request message), processes in accordance with example implementations of the present disclosure have improved backwards compatibility. Problems and complexity associated with the need for strict message sequencing are also avoided. In summary, the present disclosure provides a simple and effective solution for maintaining consistency of data regions in data storage, with minimal communications between storage systems at different sites, good backwards compatibility with earlier data storage systems and minimal latency.

As indicated above, each of FIGS. 5 and 6 illustrates a particular example of a category of node failure, requiring retransmission or resynchronization of data for an outstanding write at the time of the node failure. Other categories of node failure may occur in other implementations of the multi-node data storage system, and may be handled using similar principles.

In a variation of the example implementations of FIGS. 5 and 6, a node may need to send both a retransmission and a resynchronization for a region of a data volume, where the resynchronization is a strict superset of the retransmission. In accordance with this variation, data on the storage for the resynchronization may be read first, and data from the retransmission may then be merged into the read resynchronization data. The node may then send the data for both the resynchronization and retransmission as a single combined message to the remote system. For example, a combined message marks or otherwise indicates which bits of the data in the message correspond to a retransmission and which bits correspond to a resynchronization. In this way, the discrete parts that are of a common type can be resolved correctly according to the method of FIG. 7 and Table 1 above.

The methods of FIGS. 5, 6 and 7 may be implemented by each node of a multi-node data storage system, such as nodes 110A, 110B, 120A and 120B of the system shown in FIG. 1. In particular, each node may comprise hardware, firmware and/or software configured for carrying out the described methods for handling node failure, dependent upon the category of node failure.

As the skilled person will appreciate, example implementations of the present disclosure could include more than two data storage devices (and sites), provided each storage device contains at least one processing node, one partner node, one owner node and one backup node. Whilst in the described example implementations, the MAC addresses of the data storage devices are used for identification, it will be appreciated that any other suitable identifier for the data storage devices could be used. For example, the data storages could be assigned a permanent priority number or other identifier when they are added to the data storage system.

Whilst the described example implementations of the present disclosure relate to active-active replication of block-based data storage, the principles of the present disclosure are equally applicable to active to active replication of other types of data storage, such as file-based storage or object-based storage.

The systems described herein may be understood to communicate over any current or future communications technology, including, for example, SAS, Fiber channel or iSCSI, either in-memory within the same physical device, directly connected over a storage area network, over a general-purpose network or over the Internet.

Figure 8:
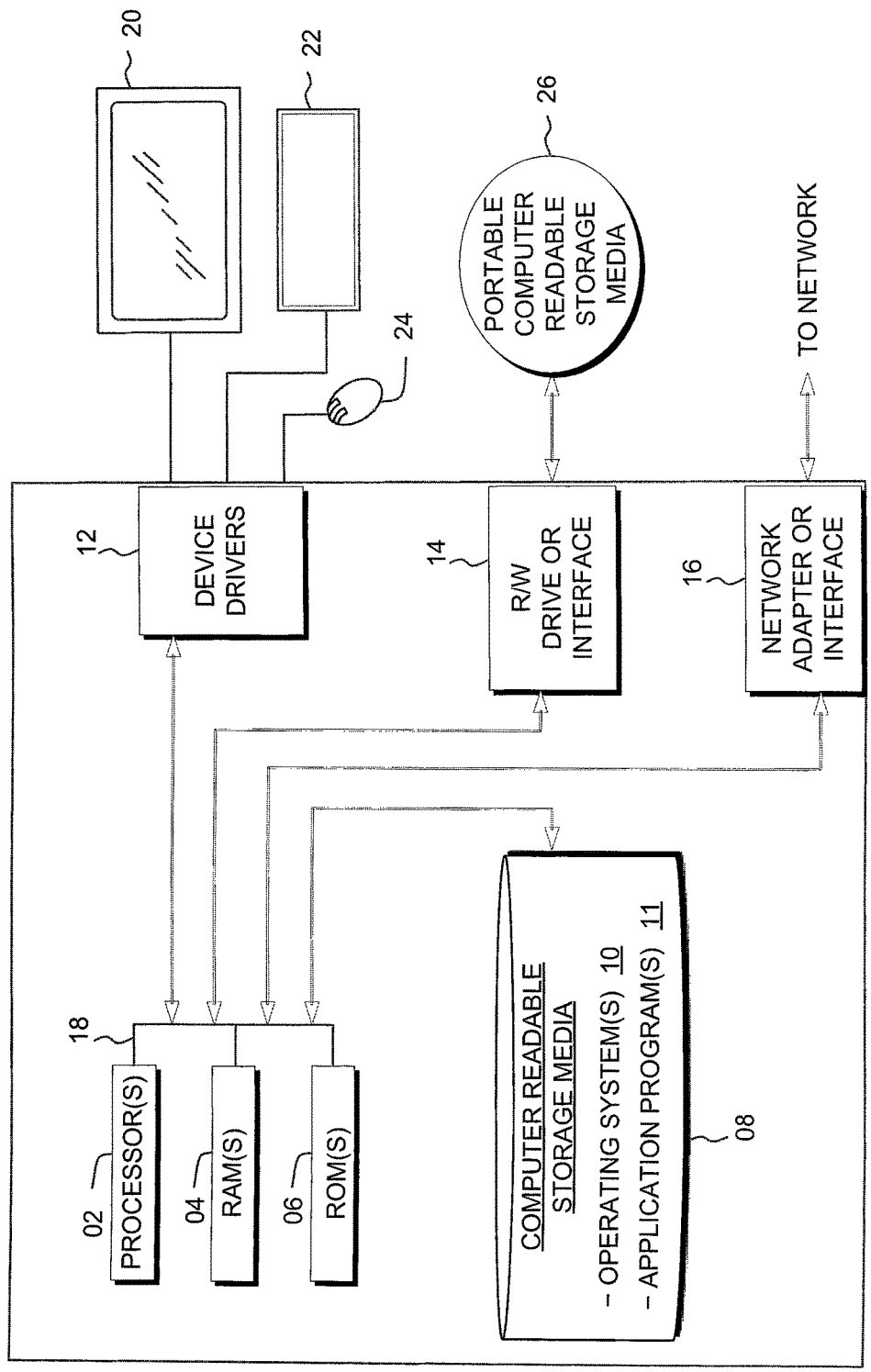
FIG. 8 is a block diagram illustrating components of nodes and data storage systems, in accordance with example implementations of the present disclosure.

FIG. 8 is a block diagram illustrating components of nodes and data storage systems, in accordance with example implementations of the present disclosure. In particular, each node and/or data storage system of the multi-node storage system shown in FIG. 1 may comprise some or all of the components shown in FIG. 8. As the skilled person will appreciate, FIG. 8 illustrates just one possible implementation of a node and/or data storage system, and other possibilities are contemplated by the present disclosure.

Computing devices of sites A and B may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 1 are stored on one or more of the computer readable storage media 08 for execution by one or more of the processors 02 via one or more of the respective RAMs 04 (which typically include cache memory). In the illustrated example, each of the computer readable storage media 08 may be a magnetic disk storage system of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information. The computer readable storage media 08 may comprise program instructions for carrying out one or more methods in accordance with the present disclosure, such as the methods of FIGS. 5, 6 and/or 7 described above.

Computing devices of sites A and B may also include a R/W drive or interface 14 to read from and write to one or more portable computer readable storage media 26. Application programs 11 on said devices may be stored on one or more of the portable computer readable storage media 26, read by the respective R/W drive or interface 14 and loaded into the respective computer readable storage media 08.

Said computing devices may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, whilst transmission, routers, firewalls, switches, gateway computers and/or edge servers.

Computing devices on site A and B may also include user interfaces such as a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware, firmware and/or software (stored on computer readable storage media 08 and/or ROM 06).

The programs described herein are identified based upon the application for which they are implemented in a specific example implementation. However, it should be appreciated that any particular program nomenclature herein is used merely for convenience, and thus the present disclosure should not be limited to use solely in any specific application identified and/or implied by such nomenclature.

Based on the foregoing, a computer system, method and computer program product being disclosed. However, numerous modifications and substitutions can be made without deviating from the scope of the present disclosure. Therefore, the present disclosure is prior provided by way of example and not limitation.

Aspects of the present disclosure may be implemented in a cloud computing environment, as described below. The skilled person will appreciate that the present disclosure is not limited to a cloud computing environment. Rather, example implementations of the present disclosure are capable of being implemented in conjunction with any other type of computing environment now known or developed in the future.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
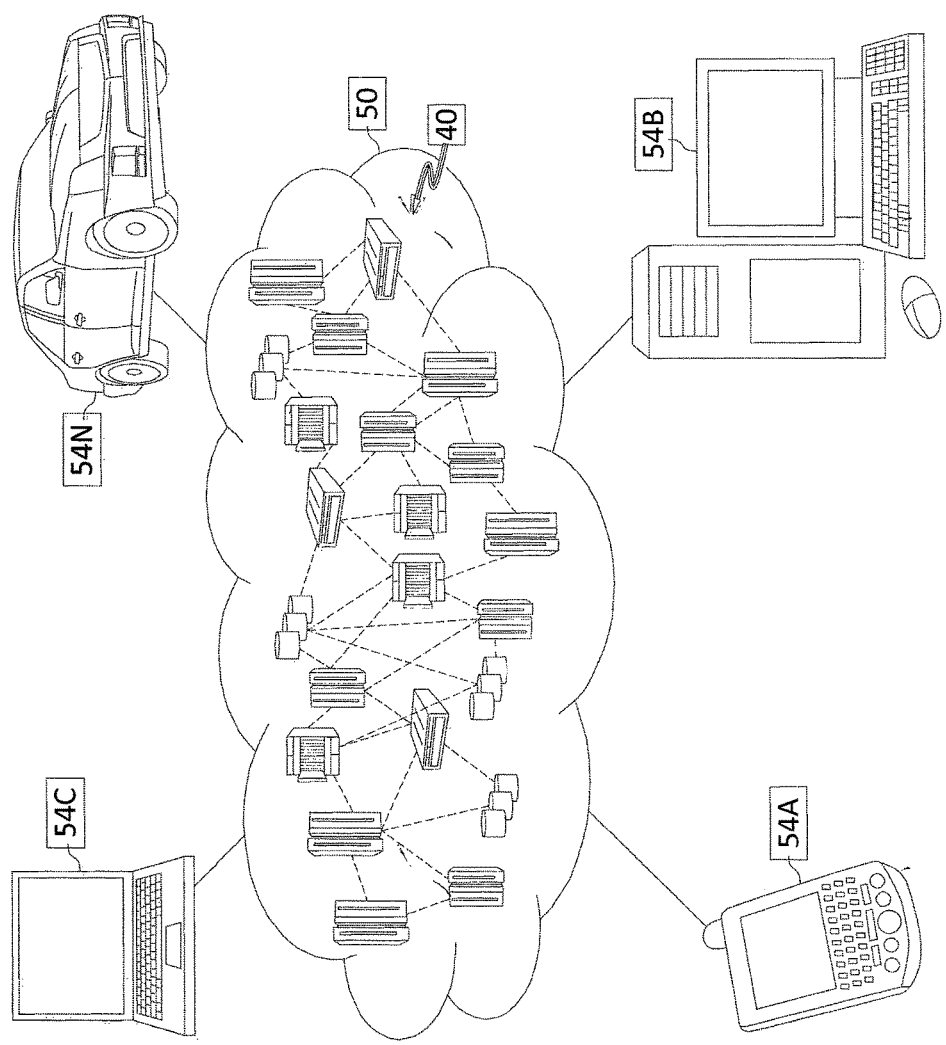
FIG. 9 illustrates a cloud computing environment, in accordance with example implementations of the present disclosure.

FIG. 9 illustrates a typical cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
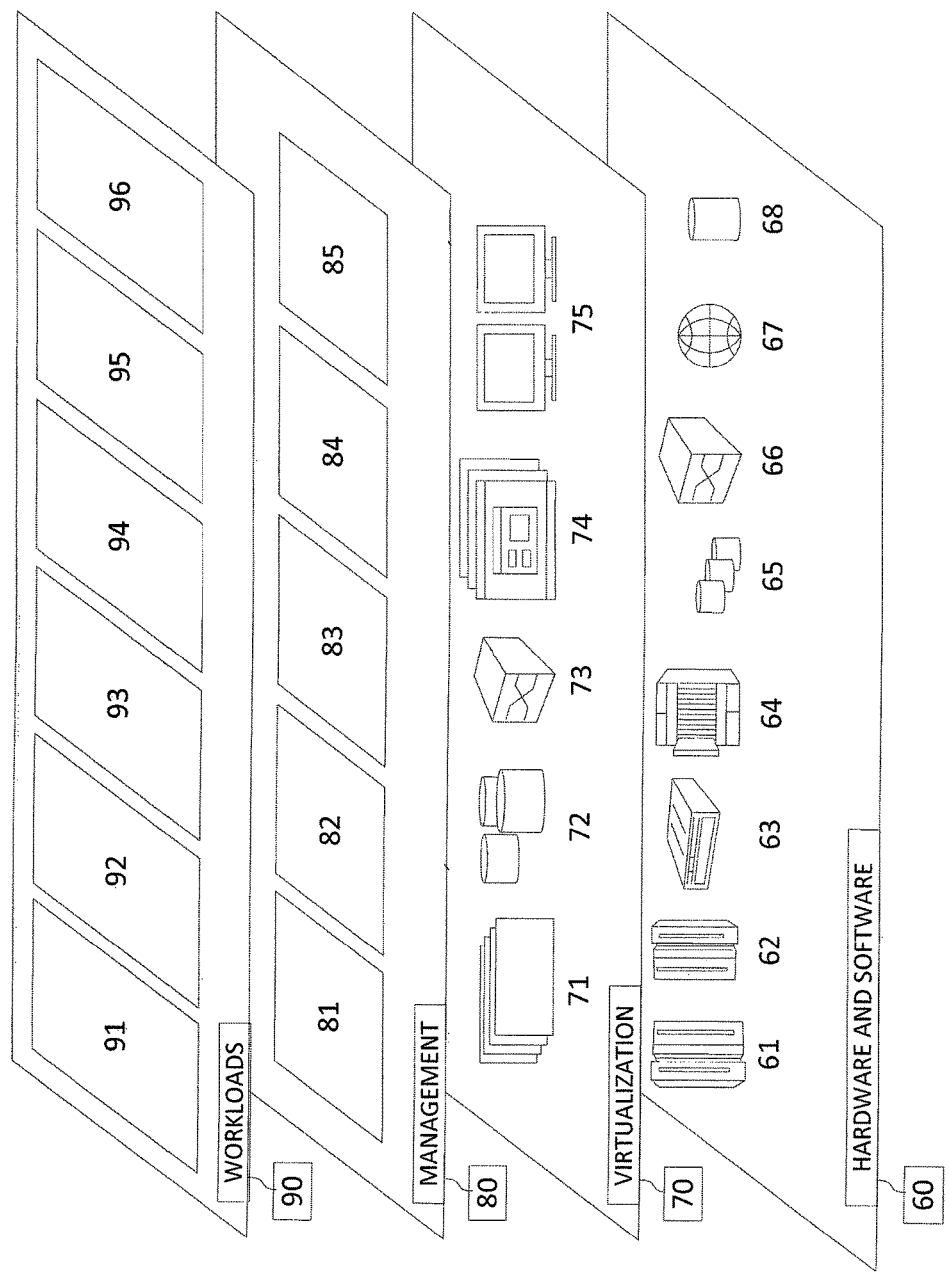
FIG. 10 illustrates abstraction model layers of the cloud computing environment of FIG. 9, in accordance with example implementations of the present disclosure.

FIG. 10 illustrates a set of functional abstraction layers provided by cloud computing environment 50 (FIG. 9) is shown. It should be understood in advance that the components, layers, and functions shown in FIG. 10 are intended to be illustrative only and implementations of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some example implementations, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94, transaction processing 95, and collision processing 96.

Whilst the present disclosure has been described and illustrated with reference to example implementations, the skilled person will appreciate that the present disclosure lends itself to many different variations and modifications not specifically illustrated herein.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. In a multi-node storage system comprising a first data storage system having an owner node and a backup node in a first location, and a second data storage system having an owner node and a backup node in a second location, wherein the first data storage system is communicatively coupled to the second data storage system and each of the first and second data storage systems includes a copy of the same data volume, a method comprising:
   detecting failure of a node of the multi-node data storage system;
   identifying an outstanding write request to the first data storage system;
   wherein, if the failed node is the owner node of the first data storage system, the method further comprises:
      determining whether the outstanding write request corresponds to a host write to the backup node of the first data storage system,
      if the outstanding write request corresponds to a host write to the backup node of the first data storage system, sending a retransmission message of the outstanding write request to a node of the second data storage system, the retransmission message comprising an indicator that the write request is a retransmission, the data to be written and the region in the data volume where the data is to be written; or
      if the outstanding write request does not correspond to a host write to the backup node of the first data storage system, reading the data region associated with the outstanding write request from the first data storage system, and sending a resynchronization message to a node of the second data storage system, the resynchronization message comprising an indicator that the write request is a resynchronization, the data read from the first data storage system to be written and the region in the data volume where the data is to be written;
   receiving a write request message, wherein the type of write request message comprises one of a resynchronization message and a retransmission message sent following failure of a node of the multi-node data storage system, wherein the write request message is received by the second data storage system from the first data storage system and comprises an indicator of the message type, the data to be written and the region in the data volume where the data is to be written;
   determining whether there is an outstanding write request to the second data storage system that corresponds to the region of the data volume in the received message;
   wherein, if there is an outstanding write request to the first data storage system that corresponds to the region of the data volume in the received message, the method further comprises:
      determining whether the write of the received write request message is the same type as the outstanding write request, and
      if the write of the received write request message is the same type as the outstanding write request, writing the data associated with a predetermined one of the first and second data storage systems to the region in the data volume of the second data storage system last, or
      if the write of the received write request message is not the same type as the outstanding write request, writing the data associated with the retransmission message to the region in the data volume of the second data storage system after writing the data associated with the resynchronization message.

2. The method of claim 1, wherein:
   if the failed node is the owner node of the second data storage system, the method comprises:
      sending a retransmission message of the outstanding write request to the backup node of the second data storage system, the retransmission message comprising an indicator that the write request is a retransmission, the data to be written and the region in the data volume where the data is to be written.

3. The method of claim 1, further comprising:
   in response to a retransmission message, receiving a replication write completion message from the second data storage system, and
   sending a host write completion message to the host of the first data storage system.

4. The method of claim 1, further comprising:
   in response to a resynchronization message, receiving a replication write completion message from the second data storage system.

5. The method of claim 1, wherein:
   if the failed node is the backup node of the first data storage system, the method comprises:
      determining whether the outstanding write request corresponds to a host write to the owner node of the first data storage system, and if the outstanding write request corresponds to a host write to the owner node of the first data storage system, sending a retransmission message of the outstanding write request to a node of the second data storage system, the retransmission message comprising an indicator that the write request is a retransmission, the data to be written and the region in the data volume where the data is to be written;

if the failed node is the backup node of the second data storage system, the method comprises:
sending a retransmission message of the outstanding write request to the owner node of the second data storage system, the retransmission message comprising an indicator that the write request is a retransmission, the data to be written and the region in the data volume where the data is to be written.

6. The method of claim 1, wherein:
if the failed node is the owner node of the first data storage system, the method is performed by the backup node of the first data storage system, and
if the failed node is the owner node of the second data storage system or the backup node of the first or second data storage system, the method is performed by the owner node of the first data storage system.

7. The method of claim 1, wherein the predetermined one of the first and second data storage systems is designated as the leader.

8. The method of claim 1, wherein:
if there is no outstanding write request to the second data storage system that corresponds to the region of the data volume in the received message, the method further comprises:
writing the data associated with the received write request message to the region of the data volume in the second data storage system.

9. The method of claim 1, further comprising:
sending a replication write completion message to the first data storage system.

10. A multi-node data storage system, comprising:
a first data storage system having an owner node and a backup node in a first location, and
a second data storage system having an owner node and a backup node in a second location,
wherein the first data storage system is communicatively coupled to the second data storage system and each of the first and second data storage systems includes a copy of the same data volume;
wherein a node of the multi-node data storage system is configured to:
detect failure of a node of the multi-node data storage system;
identify an outstanding write request to the first data storage system;
determine whether the outstanding write request corresponds to a host write to the backup node of the first data storage system;
wherein if the failed node is the owner node of the first data storage system, the node is configured to:
send a retransmission message of the outstanding write request to a node of the second data storage system, when the outstanding write request corresponds to a host write to the backup node of the first data storage system, the retransmission message comprising an indicator that the write request is a retransmission, the data to be written and the region in the data volume where the data is to be written;
read the data region associated with the outstanding write request from the first data storage system and send a resynchronization message to a node of the second data storage system, when the outstanding write request does not correspond to a host write to the backup node of the first data storage system, the resynchronization message comprising an indicator that the write request is a resynchronization, the data read from the first data storage system to be written and the region in the data volume where the data is to be written;
receive a write request message, wherein the type of write request message comprises one of a resynchronization message and a retransmission message sent following failure of a node of the multi-node data storage system, wherein the write request message is received by the second data storage system from the first data storage system and comprises an indicator of the message type, the data to be written and the region in the data volume where the data is to be written;
determine whether there is an outstanding write request to the second data storage system that corresponds to the region of the data volume in the received message;
determine whether the write of the received write request message is the same type as the outstanding write request, when there is an outstanding write request to the first data storage system that corresponds to the region of the data volume in the received message, and
write the data associated with a predetermined one of the first and second data storage systems to the region in the data volume of the second data storage system last, when the write of the received write request message is the same type as the outstanding write request, or
if the write of the received write request message is not the same type as the outstanding write request, writing the data associated with the retransmission message to the region in the data volume of the second data storage system after writing the data associated with the resynchronization message.

11. The system of claim 10, wherein the node of the multi-node data storage system is further configured to:
send a retransmission message of the outstanding write request to the backup node of the second data storage system, when the failed node is the owner node in the second data storage system, the retransmission message comprising an indicator that the write request is a retransmission, the data to be written and the region in the data volume where the data is to be written.

12. The system of claim 10, wherein the predetermined one of the first and second data storage systems is designated as the leader.

13. The system of claim 10, wherein the node of the multi-node data storage system is further configured to:
write the data associated with the received write request message to the region of the data volume in the second data storage system, when there is no outstanding write request to the second data storage system that corresponds to the region of the data volume in the received message.

14. A computer program product for use in a multi-node storage system comprising a first data storage system having an owner node and a backup node in a first location, and a second data storage system having an owner node and a backup node in a second location, wherein the first data storage system is communicatively coupled to the second data storage system and each of the first and second data storage systems includes a copy of the same data volume, the computer program product comprising a computer readable storage medium and program instructions embodied therewith, wherein the program instructions are executable by a processor to:

detect failure of a node of the multi-node data storage system;

identify an outstanding write request to the first data storage system;

wherein, if the failed node is the owner node of the first data storage system, the program instructions are executable by a processor to:

determine whether the outstanding write request corresponds to a host write to the backup node of the first data storage system, if the outstanding write request corresponds to a host write to the backup node of the first data storage system, send a retransmission message of the outstanding write request to a node of the second data storage system, the retransmission message comprising an indicator that the write request is a retransmission, the data to be written and the region in the data volume where the data is to be written; or if the outstanding write request does not correspond to a host write to the backup node of the first data storage system, read the data region associated with the outstanding write request from the first data storage system, and send a resynchronization message to a node of the second data storage system, the resynchronization message comprising an indicator that the write request is a resynchronization, the data read from the first data storage system to be written and the region in the data volume where the data is to be written;

receive a write request message, wherein the type of write request message comprises one of a resynchronization message and a retransmission message sent following failure of a node of the multi-node data storage system, wherein the write request message is received by the second data storage system from the first data storage system and comprises an indicator of the message type, the data to be written and the region in the data volume where the data is to be written;

determine whether there is an outstanding write request to the second data storage system that corresponds to the region of the data volume in the received message;

wherein, if there is an outstanding write request to the first data storage system that corresponds to the region of the data volume in the received message, the program instructions are executable by a processor to:

determine whether the write of the received write request message is the same type as the outstanding write request, and if the write of the received write request message is the same type as the outstanding write request, write the data associated with a predetermined one of the first and second data storage systems to the region in the data volume of the second data storage system last, or if the write of the received write request message is not the same type as the outstanding write request, write the data associated with the retransmission message to the region in the data volume of the second data storage system after writing the data associated with the resynchronization message.

15. The computer program product of claim 14, wherein:

if the failed node is the owner node of the second data storage system, the program instructions are executable by a processor to:

send a retransmission message of the outstanding write request to the backup node of the second data storage system, the retransmission message comprising an indicator that the write request is a retransmission, the data to be written and the region in the data volume where the data is to be written.

16. The computer program product of claim 14, wherein the predetermined one of the first and second data storage systems is designated as the leader.

17. The computer program product of claim 14, wherein, if there is no outstanding write request to the second data storage system that corresponds to the region of the data volume in the received message, the program instructions are executable by a processor to:

write the data associated with the received write request message to the region of the data volume in the second data storage system.

\* \* \* \* \*